Jan. 12, 1932.  E. W. SEEGER  1,841,157
CONTROL FOR SYNCHRONIZED DRIVES
Filed April 1, 1929
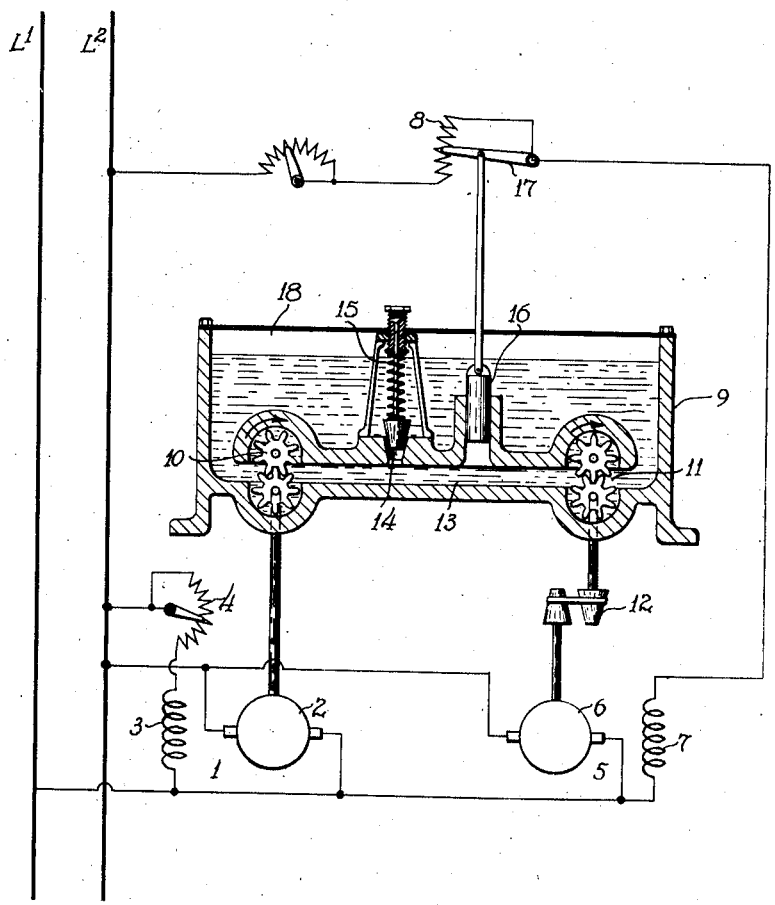
INVENTOR.
Edwin W. Seeger
BY
ATTORNEYS.

Patented Jan. 12, 1932

1,841,157

UNITED STATES PATENT OFFICE

EDWIN W. SEEGER, OF WAUWATOSA, WISCONSIN, ASSIGNOR TO CUTLER-HAMMER, INC., OF MILWAUKEE, WISCONSIN, A CORPORATION OF DELAWARE

CONTROL FOR SYNCHRONIZED DRIVES

Application filed April 1, 1929. Serial No. 351,646.

My invention relates to speed regulators for prime movers and more particularly to regulators for maintaining the speed relation of a plurality of prime movers constant at a selected value.

Speed regulating means of various forms for accomplishing the above result have been proposed in the past, but they involve highly complicated and delicate apparatus, and the present invention has among its objects to provide a rugged and simple regulator, involving only a few simple parts.

Another object is to provide a regulator which delivers a large amount of power for the control of the prime movers upon slight departure from the given condition of operation.

Another object is to provide a regulator in which the corrective effect is proportional to the deviation from normal conditions.

The accompanying drawing shows diagrammatically in a single figure one embodiment of the invention which will now be described, it being understood that the embodiment illustrated may be modified without departing from the scope of the appended claims.

Referring to the drawing the same shows a motor 1, supplied with current from lines $L^1$ and $L^2$ and having an armature 2 and a shunt field winding 3, the latter to be regulated by means of a rheostat 4. A second motor 5 with an armature 6 and a shunt field winding 7 is to be regulated, so that its speed always maintains a given relation to the speed of the motor 2. The shunt field 7 of the motor 5 is in circuit with a rheostat 8, which is adjusted by means of a regulating device 9.

The device 9 consists of two gear or other positive displacement pumps 10 and 11. The pump 10 is directly connected with the motor 2, while an adjustable speed change device 12 is interposed between the pump 11 and the motor 5. Hence, with a fixed setting of the speed change device, the speed of the pumps varies proportionally with the speed of the respective motor, while the ratio of the pump speeds relative the ratio of the motor speeds may be varied by changing the setting of the speed change device 12. The delivery end of pump 10 is connected with the suction end of pump 11 by means of the conduit 13. The conduit is provided with a valve 14, which is biased to closed position by the spring 15. The valve is constructed to permit the passage of a quantity of fluid from the conduit 13, such quantity of fluid varying with the pressure in said conduit. The spring is adjustable, such adjustment permitting to vary the amount of fluid which passes through the valve for a given pressure. The conduit is also provided with a cylinder in which is fitted a piston 16, operatively connected to a contact lever 17, the latter controlling the amount of resistance of the rheostat 8, which is connected in series with the field winding 7, such amount depending upon the position of the piston in the cylinder. The fluid which is dicharged by the pump 11, as well as that discharged by the valve 14 is emptied into a chamber 18 formed by the housing of the regulator 9 and returns from there to the pump 10.

The device operates in the following manner:

Assuming that the speed of motor 1 is adjusted to a certain value by means of the rheostat 4, the motor drives the pump 10 at a corresponding speed, and the pump forces an equivalent quantity of fluid from the chamber 18 into the conduit 13. If the motor 5 is also running and drives the pump 11 at a speed at which pump 11 absorbs all the fluid which is delivered by pump 10, the pressure in conduit 13 will be zero, and therefore the piston 16 will assume its lowermost position, and the motor 5 will operate at maximum field strength and minimum speed. Also the valve 14 will be held closed by the action of the spring 15. If, however, for any reason the motor 5 slows down relative to the motor 1, the pump 11 will not be able any more to absorb all the fluid delivered by pump 11, with the result, that the pressure in the conduit will increase, thereby raising the piston 16 and inserting resistance into the field circuit of motor 5. This will cause motor 5 to speed up, thus increasing the amount of fluid absorbed by the pump 11 and thereby tending to again decrease the pressure in conduit 13. Also as the pressure in conduit 13 increases, the fluid tends to raise the valve 14, such action being opposed by the adjustable spring 15. This action of the valve 14 tends to reduce the pressure increase in the conduit and thereby reduces the distance which the piston 16 will travel for a given difference in quantity of fluid delivered by the two pumps.

The quantity of fluid which the valve 14 will by-pass upon a rise in pressure within the conduit may be regulated by adjustment of the spring 15, whereby, if the pressure required to lift the plunger 16 is fixed by its weight or by other well known means, the difference in speed between pumps 10 and 11, which will actuate the plunger 16 and thus vary the speed of the motor, can be adjusted. It will thus be seen that the relative speeds of motors 1 and 5 may be adjusted by an adjustment of the valve 14. It will also be obvious that further adjustment may be obtained by varying the loading of the piston 16, either by weights or by springs, and by making such loading adjustable.

Further adjustment of the relative speeds of motors 1 and 5 may be had by adjustment of the speed change device 12, and a similar speed change device may be connected between motor 1 and pump 10.

It is also apparent that either the adjustable spring 15 or the speed change device 12 may be omitted, without affecting the automatic control of motor 5 by motor 1, and both adjustments may be omitted, if the speed ratio of the motors is to be always maintained at the same value.

A further adjustment of the relative speeds of the two motors may be obtained by designing either or both pumps for adjustable delivery at a given speed.

It is further possible to design the pumps 10 and 11 so that for the same speed they have different capacity, in order to provide for a modification of the relative speed of the two motors at which the regulating device functions.

The aforedescribed arrangement is illustrative of one embodiment of my invention, and it is understood by those skilled in the art, that the invention may take various other forms within the scope of the appended claims.

What I claim and desire to secure by Letters Patent of the United States is:—

1. In a controller for regulating the speed of one prime mover in accordance with the speed of another prime mover, in combination, a pump driven by each of the prime movers, a fluid circulated by said pumps, a conduit connecting said pumps, automatic means responsive to the pressure in said conduit for regulating the fluid delivered to one of the pumps in accordance with said pressure, and means responsive to the pressure in said conduit for regulating the speed of one of the prime movers.

2. In a controller for regulating the speed of one prime mover in accordance with the speed of another prime mover, in combination a pump driven by each of the prime movers, a fluid circulated by said pumps, a conduit connecting said pumps, a relief valve in said conduit adapted to open in proportion to the pressure therein, and means responsive to the pressure in said conduit for regulating the speed of one of the prime movers.

3. In a controller for regulating the speed of one prime mover in accordance with the speed of another prime mover, in combination, a pump driven by each of the prime movers, a fluid circulated by said pumps, a conduit connecting said pumps, means responsive to pressure conditions within said conduit for regulating the speed of one of the prime movers, and means for regulating the fluid delivered to one of the pumps upon given variations in the relative speed of said pumps, said last mentioned means including a relief valve in said conduit adapted to open in proportion to the pressure therein.

4. In a controller for regulating the speed of one motor in accordance with the speed of another motor, in combination, a pump driven by each of the motors, variable speed coupling means between one of said motors and its pump, one of said pumps being arranged to receive the discharge of the other of said pumps, a fluid circulated by said pumps, a speed regulator responsive to pressure conditions between said pumps for controlling the speed of one of said motors, a valve for regulating the fluid delivered to one of the pumps in accordance with the difference in speed of said pumps, said valve being responsive to the pressure between said pumps and having means associated therewith for varying the pressure at which the same responds.

In witness whereof, I have hereunto subscribed my name.

EDWIN W. SEEGER.